(12) United States Patent
Tamor

(10) Patent No.: US 6,286,635 B1
(45) Date of Patent: Sep. 11, 2001

(54) VEHICLE BRAKING SYSTEM WITH ACTIVELY CONTROLLED CALIPER RETRACTOR

(75) Inventor: Michael Alan Tamor, Toledo, OH (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/323,381

(22) Filed: Jun. 1, 1999

(51) Int. Cl.$^7$ ................................................. F16D 55/22
(52) U.S. Cl. ..................... 188/72.3; 188/71.8; 180/65.3
(58) Field of Search ............................... 188/73.31, 72.3, 188/72.6, 71.8; 180/65.3

(56) References Cited

U.S. PATENT DOCUMENTS

| | | | |
|---|---|---|---|
| 4,375,842 | * 3/1983 | Melinat | 188/71.8 |
| 4,428,462 | * 1/1984 | Warwick | 188/72.4 |
| 4,662,483 | * 5/1987 | Boeck | 188/72.3 |
| 4,802,559 | * 2/1989 | Fourie | 188/196 A |
| 5,046,404 | * 9/1991 | Schnorenberg | 92/130 B |
| 5,450,324 | * 9/1995 | Cikanek | 364/426.02 |
| 5,632,534 | * 5/1997 | Knechtges | 303/152 |
| 5,788,597 | * 8/1998 | Boll | 477/4 |
| 5,806,635 | * 9/1998 | Bae | 188/106 |
| 5,839,800 | * 11/1998 | Koga | 303/152 |
| 5,853,229 | * 12/1998 | Willmann | 303/3 |

* cited by examiner

Primary Examiner—J. J. Swann
Assistant Examiner—David Divine
(74) Attorney, Agent, or Firm—Gregory P. Brown; William J. Coughlin

(57) ABSTRACT

A vehicle braking system having a brake rotor (10) and brake pedal-actuated hydraulic piston (24) that actuates a brake caliper (22) to engage a friction brake (25a, 25b) with the rotor (10) and further having a brake caliper retractor mechanism (40) including an actuator (46) for actively controlling retraction of the caliper (22) relative to the rotor (10) to provide either a friction brake force versus pedal brake force curve where the friction brake initially contacts the rotor (10) such that braking force from the brake pedal P begins at zero pedal force or a friction brake force versus pedal brake force curve that is displaced relative thereto where the friction brake initially is positioned out of contact with the rotor (10) such that braking force from the brake pedal begins at a finite preselected pedal force greater than zero. In an electric or hybrid electric vehicle, the displaced friction brake force versus pedal brake force curve permits series regenerative braking by an electric drive of the vehicle. In a conventional vehicle powered only by an internal combustion engine, the displaced friction brake force versus pedal brake force curve avoids brake drag.

7 Claims, 2 Drawing Sheets

VEHICLE BRAKING SYSTEM WITH ACTIVELY CONTROLLED CALIPER RETRACTOR

BACKGROUND OF THE INVENTION

1. Field of the Invention

The present invention relates to a vehicle braking system for electric, hybrid electric, and conventional vehicles having an actively controlled brake caliper retractor mechanism.

2. Description of Related Art

As vehicle manufacturers increase the fuel economy of conventional vehicles using internal combustion engines, so-called parasitic fuel economy penalties previously considered trivial must be reduced. One such parasitic loss is attributable to disc brake caliper drag which occurs as a result of intentionally maintaining the brake pads in light contact with the brake rotor at all times of vehicle operation to provide a familiar and consistent brake feel to the vehicle driver. Although small, this friction imposes a fuel economy penalty, especially at high vehicle speeds and contributes to brake wear.

For electric vehicles (EV) and hybrid electric vehicles (HEV), parallel and series regenerative braking systems have been investigated. In the parallel system, a fixed relationship is imposed between the regenerative braking power applied by the vehicle drive motor, vehicle speed, accelerator pedal position, and brake pedal pressure, with the driver maintaining control of the hydraulic brakes. In order to collect a large fraction of the braking energy available in typical urban driving, the regenerative braking force must be equivalent to that which would be applied by the driver using conventional disk brakes of the vehicle, but with no driver input from the brake pedal. This results in either unfamiliar vehicle characteristics (e.g. rapid deceleration when the accelerator pedal is released) or curtailment of regenerative braking in order to achieve a more familiar vehicle "coast down" behavior. A series regenerative braking system typically includes an additional brake-by-wire system to intervene in driver control of the hydraulic brakes and optimally partition the driver-demanded braking force between the vehicle electric drive motor and friction brakes. Although the series regenerative braking system is efficient and maintains familiar vehicle behavior, it is expensive and adds to vehicle weight.

SUMMARY OF THE INVENTION

An object of the present invention is to provide a vehicle braking system having a brake rotor and a brake pedal-actuated hydraulic piston that actuates a brake caliper to engage a friction brake with the rotor and further having a brake caliper retractor mechanism including an actuator for actively controlling retraction of the friction brake relative to the rotor. The brake caliper retractor mechanism is actively controlled to provide either 1) a friction brake force versus pedal brake force curve where the friction brake initially contacts the rotor such that braking force from the brake pedal begins at zero pedal force or 2) a friction brake force versus pedal brake force curve that is displaced where the friction brake initially is positioned out of contact with the rotor such that braking force from the brake pedal begins at a finite preselected brake pedal force greater than zero. In an electric or hybrid electric vehicle, the displaced friction brake force versus pedal brake force curve permits series regenerative braking by an electric drive (e.g. electric drive motor or transmission) of the vehicle. In a conventional vehicle powered only by an internal combustion engine, the displaced friction brake force versus pedal brake force curve avoids brake drag.

DETAILED DESCRIPTION OF THE PREFERRED EMBODIMENT

Figure 1:
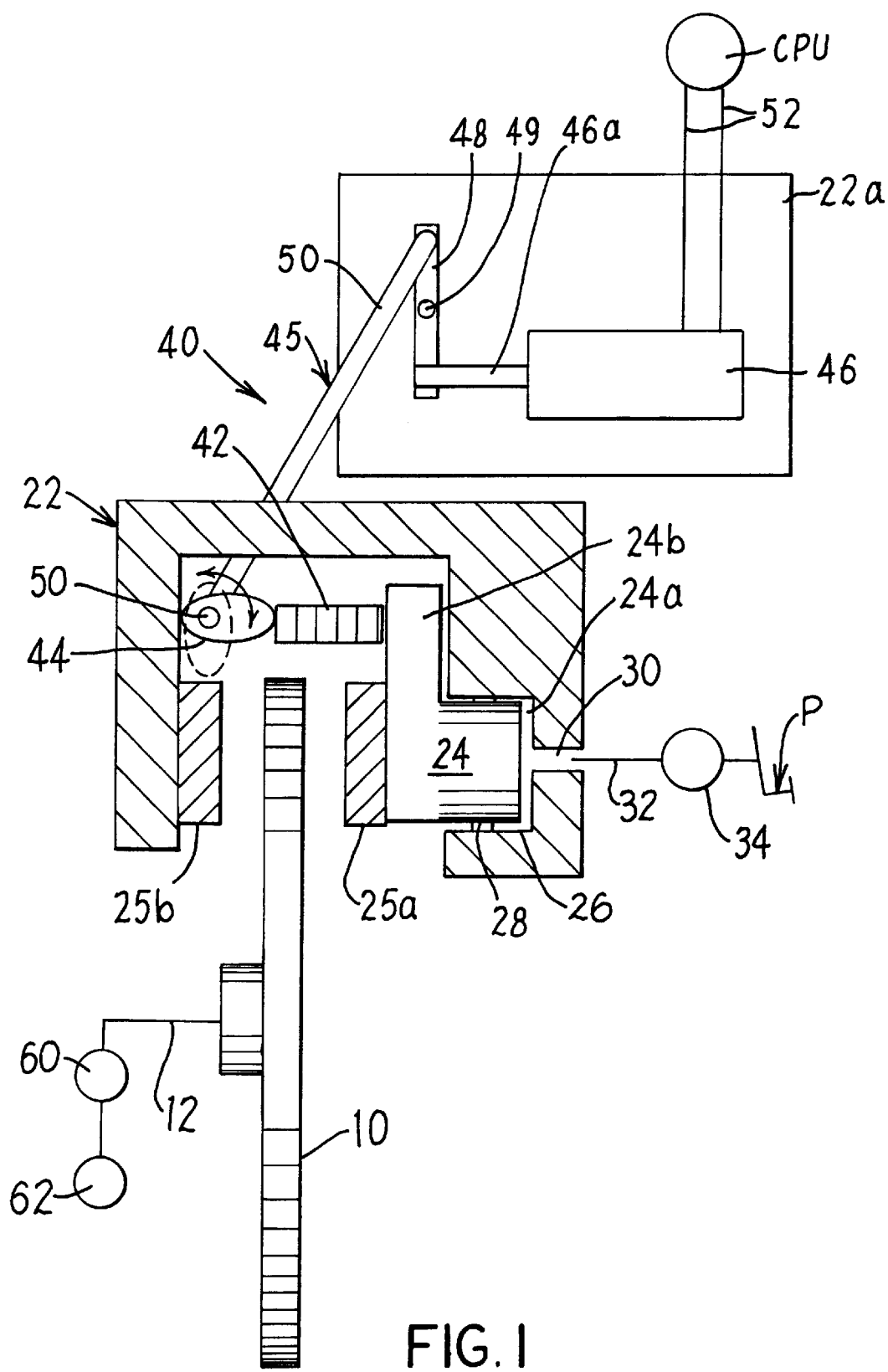
FIG. 1 is a schematic view of a vehicle braking system with a caliper shown partially exploded to illustrate a mechanical disk brake caliper retractor mechanism pursuant to an embodiment of the invention.

Referring to FIG. 1, an embodiment of the present invention including an actively controlled brake caliper retractor mechanism is schematically illustrated for use with a caliper disk brake system at a wheel of a vehicle, other wheels having a like braking system. The vehicle caliper disk braking system comprises a conventional brake rotor disk 10 connected to a rotatable vehicle axle 12 in conventional manner and a conventional floating brake caliper (knuckle) 22 comprising friction brake pads 25a, 25b that are engaged with opposite sides of the rotor disk 10 by movement of hydraulic piston 24. In FIG. 1, the caliper 22 and a caliper cover 22a are shown exploded for convenience in viewing internal braking components. For example, the brake pad 25a is shown disposed on a first end of the piston 24 for movement therewith, while brake pad 25b is disposed on the floating caliper 22 in conventional manner that movement of the piston 24 toward the disk 10 causes the friction brake pads 25a, 25b to engage opposite sides of the rotor disk 10 for braking. The piston 24 resides in a bore 26 in the caliper 22 with an annular (e.g. O-ring) seal 28 interposed between the periphery of the piston 24 and the cylindrical wall of the bore. The second end 24a of the piston 24 residing in the bore 26 is communicated to inlet 30 of hydraulic brake fluid conduit 32 that, in turn, is communicated to the master brake cylinder 34 of the vehicle. Master brake cylinder 34 is actuated by the vehicle driver's pressing the brake pedal P in conventional manner to control vehicle braking.

In the embodiment of the invention illustrated in FIG. 1, a mechanical brake caliper retractor mechanism 40 is provided for retracting the brake pads 25a, 25b relative to the rotor 10 in a manner that is useful to permit series regenerative braking in EV's and HEV's and to reduce parasitic fuel economy penalty resulting from brake drag in conventional internal combustion engine powered vehicles. The mechanical brake caliper retractor mechanism 40 comprises a retractor spring 42 and a cam 44 connected to an actuator linkage 45 of actuator 46 disposed on the outer cover 22a of the caliper 22. The spring 42 is disposed between a rigid extension 24b of the piston and the cam 44. The actuator linkage 45 includes a push/pull output shaft 46a of the actuator 46, a pivotal link 48 mounted on outer cover 22a by pivot pin 49, and a link arm 50 that is connected to the link 48 and to the cam 44 as illustrated in FIG. 1 to pivot the cam 44 as shown by the arrow in response to linear movement of the actuator output shaft 46a. The actuator 46 can comprise a push/pull solenoid, for example only, as other linear or rotary actuators with an appropriate linkage can be used in practice of the invention to move cam 44 relative to retractor spring 42. The actuator 46 is connected to a vehicle microprocessor control CPU via electrical conductors 52 to receive commands therefrom based on vehicle braking, vehicle speed and other vehicle operational data.

Figure 3:
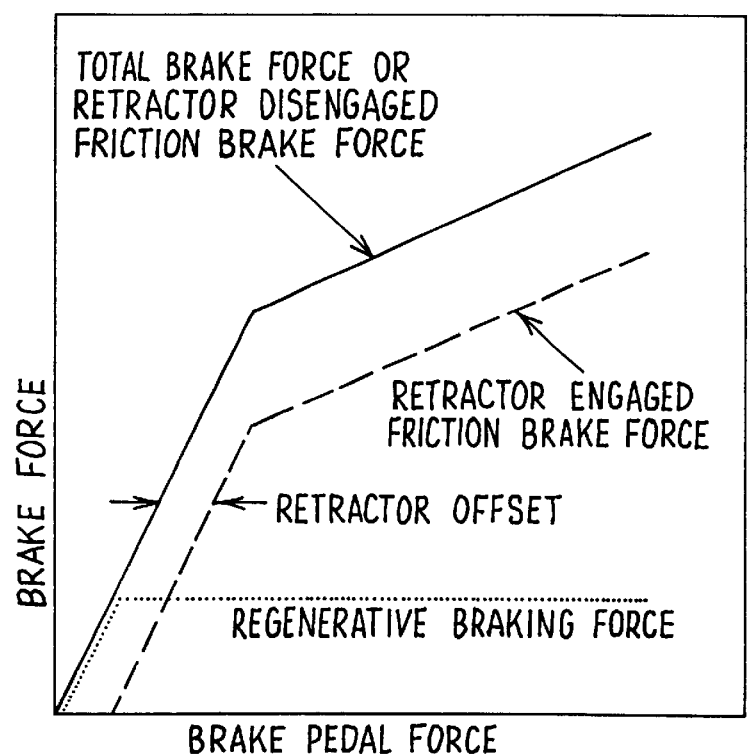
FIG. 3 is a graphical illustration of a friction brake force versus pedal brake hydraulic force curve (solid line) where the brake pad initially is in contact with the rotor such that braking force from the brake pedal begins at zero pedal force and a curve that is displaced or offset pursuant to the invention (dashed line). The dotted line curve represents regenerative braking force with the sum of the dotted line curve and dashed line curve equaling the solid line curve.

The brake caliper retractor mechanism 40 is operable by actuator 46 to a disengaged mode or an engaged mode as commanded by control CPU to control retraction of the brake caliper 22 to provide either a conventional friction brake force versus pedal brake force curve where braking force from pedal P begins at zero pedal force, FIG. 3 (solid line curve), or one that is displaced or offset such that brake force does not begin at zero pedal force but instead at a finite preselected pedal force X greater than zero, FIG. 3 (dashed line curve). For example, in the engaged mode of the retractor mechanism 40 (cam 44 placed in solid line position of FIG. 1 by actuator 46), the retractor mechanism completely disengages the friction brake pads 25a, 25b out of contact with disk 10 in the range of low brake pedal force operation. In this condition, the electric vehicle drive 60 (e.g. the electric drive motor or drive transmission) is operated in a regenerative mode so as to replicate the behavior of the conventional friction brakes 25a, 25b of the vehicle. As the braking force exceeds a preset limit for the regenerative braking at higher brake demand, the friction brakes 25a, 25b will engage the rotor 10 by virtue of hydraulic pedal brake force overcoming the spring 42 under direct control of the vehicle driver via the brake pedal P with the electric regenerative braking making up only the difference between the friction brake force with or without the retractor mechanism 40 engaged, FIG. 3 (dotted line curve). The control CPU will command actuator 46 to disengage the mechanism 40 (cam 44 placed in dashed line position by actuator 46) once the vehicle comes to a stop to allow caliper 22 to return to its normal position relative to disk 10 to provide slight contact of brake pads 25a, 25b therewith. As most regenerative energy appears at relatively low brake pedal force/low power operation, the simplified, lost cost regenerative braking system pursuant to the invention is efficient in storing what otherwise would be wasted braking heat, while providing a familiar brake pedal feel to the driver. Regenerative braking energy saved by the system can be stored in an energy storage device 62, such as a battery connected to electric drive 60 for an EV or HEV vehicle, a flywheel, or other energy storage device connected to or driven by the drive 60. For EV or HEV vehicles, the retraction force on the caliper 22 in the engaged mode of mechanism 40 constitutes a significant fraction of the achievable hydraulic closure force of the braking system but is not so large that it cannot be readily overcome by manual brake pedal actuation in the event of failure of the retractor mechanism 40 to disengage. Should the energy storage device 62 be unable to accept regenerative energy, the control CPU will command actuator 46 to disengage the retractor mechanism 40 so that conventional braking using brake pedal P is available to the driver.

In conventional motor vehicles driven by an internal combustion engine only, the brake caliper retractor mechanism 40 can be placed in the engaged mode (cam 44 in solid line position of FIG. 1) by actuator 46 as commanded by the microprocessor control CPU during driving above a preset speed, for example, to avoid brake drag and thereby reduce parasitic fuel economy penalty attributable to brake drag. The brake caliper retractor mechanism 40 can be actuated by actuator 46 to the disengaged mode (cam 44 in dashed line position of FIG. 1) whenever the need for conventional braking is determined by the control CPU at any driving speed. For example, when either the brake pedal is pressed by the driver to actuate a conventional brake pedal switch to an "ON" condition or the accelerator pedal falls below a predetermined angle (lower power demand) recognized by the control CPU, the retractor mechanism 40 can be actuated to the disengaged mode, and the caliper 22 thereby allowed to return to its normal position to disk 10 to provide conventional braking. The retractor mechanism 40 also can be actuated to the disengaged mode by control CPU at vehicle speeds below a preset vehicle speed (e.g. city driving speeds) where a familiar brake pedal feel (without a dead pedal) is desirable to the vehicle driver. The retraction force on the caliper 22 in the engaged mode of retractor mechanism 40 is small such that the retraction force can be easily overcome when there is a need for braking. The retraction force is so small that the hydraulic braking force can easily overcome it in the event of a failure of the retractor mechanism 40 and emergency stopping would be unaffected, although brake feel to the driver may be degraded. Overall fuel economy of a conventional vehicle will be improved by appropriately engaging and disengaging the brake caliper retractor mechanism 40 in this manner.

Figure 2:
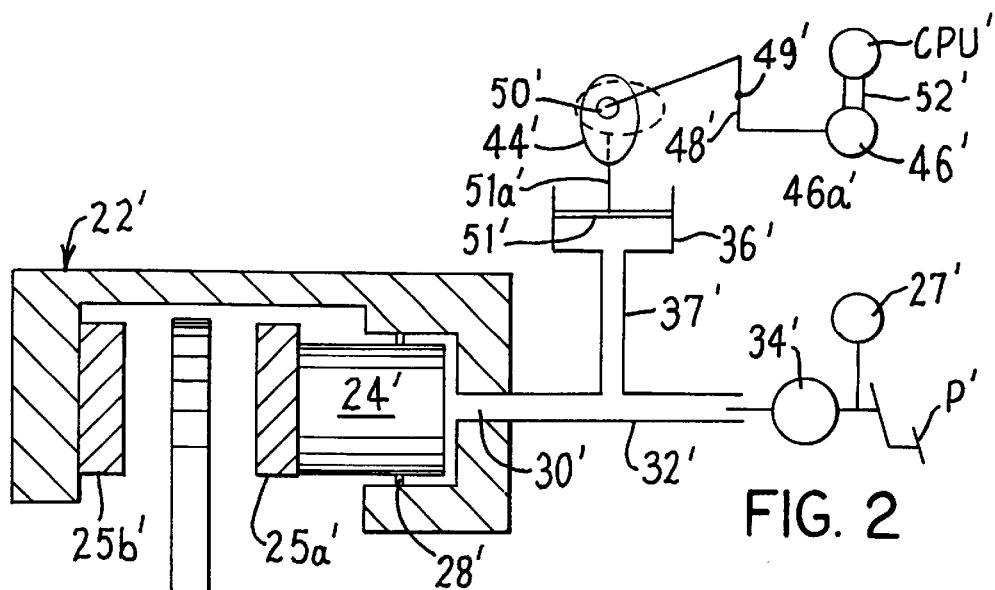
FIG. 2 is a schematic view of a braking system having a hydraulic disk brake caliper retractor mechanism pursuant to another embodiment of the invention.

Referring to FIG. 2 where like features of FIG. 1 are represented by like reference numerals primed, a hydraulic brake caliper retractor mechanism 40' is provided and operable by actuator 46' in a retractor disengaged mode or an engaged mode. The hydraulic brake caliper retractor mechanism 40' comprises a resilient annular (O-ring) seal 28' that is geometrically designed and installed to retract the piston 24' slightly away from the rotor disk 10' when no hydraulic pressure is present. That is, a neutral seal position is established effective to retract the brake pads 25a', 25b' of the floating caliper 22' from contact with disk 10' when no hydraulic pressure is present. A small secondary brake fluid cylinder or reservoir 36' is provided as part of the hydraulic brake system proximate the piston 24' in communication via conduit 37' with the fluid conduit 32' and master cylinder 34'. The volume of brake fluid in reservoir 36' is varied by a piston 51' whose position in the reservoir is controlled by a cam 44' engaging piston shaft 51a'. The cam 44' is connected to an actuator 46' by link arm 50' and pivotal link 48', or other mechanical or hydraulic connecting means, to output shaft 46a' of an actuator 46' of the type shown in FIG. 1 disposed proximate the piston 24'.

In conventional motor vehicles driven by an internal combustion engine only, the hydraulic brake caliper retractor mechanism 40' can be placed in its engaged mode (cam 44' in dashed line position of FIG. 2) by the microprocessor control CPU' during driving above a preset speed, for example, to allow brake pads 25a', 25b' to be retracted from disk 10' to avoid brake drag and thereby reduce parasitic fuel economy penalty attributable to brake drag. The brake caliper retractor mechanism 40' can be actuated by the control CPU' to its disengaged mode (cam 44' in the solid line position of FIG. 2) whenever the need for braking is determined by the control CPU' at any driving speed. For example, when either the brake pedal is pressed by the driver to actuate a conventional brake pedal switch to an "ON" condition or the accelerator pedal falls below a predetermined angle (lower power demand) recognized by the control CPU', the retractor mechanism 40' can be actuated to its disengaged mode, and the caliper 22' thereby allowed to return to its normal position to provide conventional braking. The retractor mechanism 40' also can be actuated to the disengaged ode by control CPU' at vehicle speeds below a preset vehicle speed (e.g. city driving speeds). The retraction force on the caliper 22' in the engaged mode of retractor mechanism 40' is mall such that the retraction force can be easily overcome when there is a need for braking. The retraction force is so small that the hydraulic braking force can easily overcome it in the event of a failure of the retractor mechanism 40' and emergency stopping would be unaffected, although brake feel to the driver may be degraded. Overall fuel economy of the vehicle will be improved by appropriately engaging and disengaging the brake caliper retractor mechanism 40' in this manner.

In EV's and HEV's, when the retractor mechanism 40' is in its engaged mode, the friction brakes 25a', 25b' are completely disengaged from the disk 10'. In this condition, the electric vehicle drive 60' (e.g. the electric drive motor or drive transmission) is operated in a regenerative mode so as to replicate the behavior of the friction brakes 25a', 25b'. A hydraulic brake pedal simulator 27' forming no part of the present invention may be provided in this embodiment and operably connected to the brake pedal P' to provide a desired consistent and familiar brake pedal feel as needed to prevent dead pedal feel to the vehicle driver. As the braking force exceeds a preset limit for the regenerative braking at higher brake demand, the friction brakes 25a', 25b' will engage the rotor 10' under direct control of the vehicle driver via the brake pedal P' with the electric regenerative braking making up only the difference between the friction brake force with or without the retractor mechanism 40' engaged, FIG. 3. The control CPU' will disengage the mechanism 40' once the vehicle comes to a stop to provide familiar brake pedal feel to the driver. The simplified, lost cost regenerative braking system pursuant to another embodiment of the invention is efficient in storing what otherwise would be wasted braking heat. Regenerative braking energy saved by the system can be stored in an energy storage device 62' in the manner described above. For EV or HEV vehicles, the retraction force on the caliper 22' in the engaged mode of mechanism 40' will constitute a significant fraction of the achievable hydraulic closure force of the braking system but is not so large that it cannot be readily overcome by manual brake pedal actuation in the event of failure to disengage. Should the energy storage system be unable to accept regenerative energy, the control CPU' will disengage the mechanism 40' so that conventional braking is available to the driver.

What is claimed is:

1. A braking system for an electric or hybrid electric vehicle, comprising a brake rotor and brake pedal-actuated hydraulic piston that actuates a brake caliper to engage a friction brake with the rotor and further comprising a brake caliper retractor mechanism for retracting the piston and including an actuator for actively controlling retraction of the piston relative to the rotor between a first mode providing (i) a friction brake force versus pedal brake force curve where the friction brake initially contacts the rotor such that braking force from the brake pedal begins at zero pedal force and a second mode providing (ii) a friction brake force versus pedal brake force curve that is displaced where the friction brake initially is positioned out of contact with the rotor such that braking force from the brake pedal begins at a finite preselected pedal force greater than zero, and an electric drive of said vehicle that provides regenerative braking when the displaced friction brake force versus pedal brake force curve (ii) is provided.

2. The system of claim 1 wherein said retractor mechanism comprises a cam controlled by the actuator and a spring disposed between the cam and the piston, said cam being positioned by the actuator to a position that retracts the friction brake out of contact with the rotor and to another position that allows the friction brake to contact the rotor.

3. The system of claim 1 wherein said retractor mechanism comprises a seal about the piston, said seal biasing the piston in a manner to retract the friction brake out of contact with the rotor, a retractor piston residing in a fluid reservoir communicated to a master cylinder, a cam positioned by the actuator to a mode that allows said retractor piston to move in said reservoir to allow said seal to retract the friction brake away from the rotor and to another mode that moves said retractor piston in a manner to displace fluid from said reservoir to contact the friction brake with the rotor.

4. A method of braking an electric or hybrid electric vehicle having a brake rotor and a brake pedal-actuated hydraulic piston that actuates a brake caliper to engage a friction brake with the rotor, comprising actively controlling retraction of the piston relative to the rotor between a first mode providing (i) a friction brake force versus pedal brake force curve where the friction brake initially contacts the rotor such that braking force from the brake pedal begins at zero pedal force and a second mode providing (ii) a friction brake force versus pedal brake force curve that is displaced where the friction brake initially is positioned out of contact with the rotor such that braking force from the brake pedal begins at a finite preselected pedal force greater than zero, and providing regenerative braking by an electric drive of said vehicle when the displaced friction brake force versus pedal brake force curve (ii) is provided.

5. The method of claim 4 including actively controlling retraction of the caliper using a vehicle microprocessor.

6. The system of claim 1 wherein said electric drive of said vehicle comprises an electric motor or transmission.

7. The method of claim 4 including providing series regenerative braking by said electric drive of said vehicle when the displaced friction brake force versus pedal brake force curve (ii) is provided.

* * * * *